(12) United States Patent
Wattenburg

(10) Patent No.: US 6,670,728 B2
(45) Date of Patent: Dec. 30, 2003

(54) METHOD AND SYSTEM TO AUTOMATICALLY REDUCE GENERATED POWER

(75) Inventor: Willard H. Wattenburg, Walnut Creek, CA (US)

(73) Assignee: The CSU, Chico Research Foundation, Chico, CA (US)

( * ) Notice: Subject to any disclaimer, the term of this patent is extended or adjusted under 35 U.S.C. 154(b) by 46 days.

(21) Appl. No.: 10/098,260

(22) Filed: Mar. 14, 2002

(65) Prior Publication Data

US 2002/0130558 A1 Sep. 19, 2002

Related U.S. Application Data

(60) Provisional application No. 60/275,922, filed on Mar. 14, 2001.

(51) Int. Cl.[7] .............................................. H01B 11/02
(52) U.S. Cl. ........................... 307/147; 307/34; 307/39; 700/295
(58) Field of Search ................................ 307/147, 126, 307/29, 34, 39; 700/295

(56) References Cited

U.S. PATENT DOCUMENTS

| | | | | |
|---|---|---|---|---|
| 4,389,577 A | * | 6/1983 | Anderson et al. | 307/39 |
| 5,644,173 A | * | 7/1997 | Elliason et al. | 307/34 |
| 5,675,503 A | * | 10/1997 | Moe et al. | 700/296 |
| 6,181,985 B1 | * | 1/2001 | O'Donnell et al. | 700/295 |

* cited by examiner

*Primary Examiner*—Brian Sircus
*Assistant Examiner*—Sharon A. Polk
(74) *Attorney, Agent, or Firm*—Dorsey & Whitney LLP

(57) ABSTRACT

Consumer use of 240 VAC power can be reduced automatically by a power utility. A switch, remotely controllable by the power utility, can break the normal T1-P1 and T2-P2 power connections, and instead allow T1 to float, and coupled P1 and P2 together and via a current limiter to T2. The result is that in-phase 120 VAC is available from P1 or P2, but no 240 VAC is provided, thus eliminating power consumption by 240 VAC appliances. When the need to reduce 240 VAC power consumption has passed, the switch is reconfigured to again connect T1-P1 and T2-P2. The switch may be disposed on a power utility pole, or at a consumer's premises, before, after, or indeed within the consumer's power meter.

24 Claims, 6 Drawing Sheets

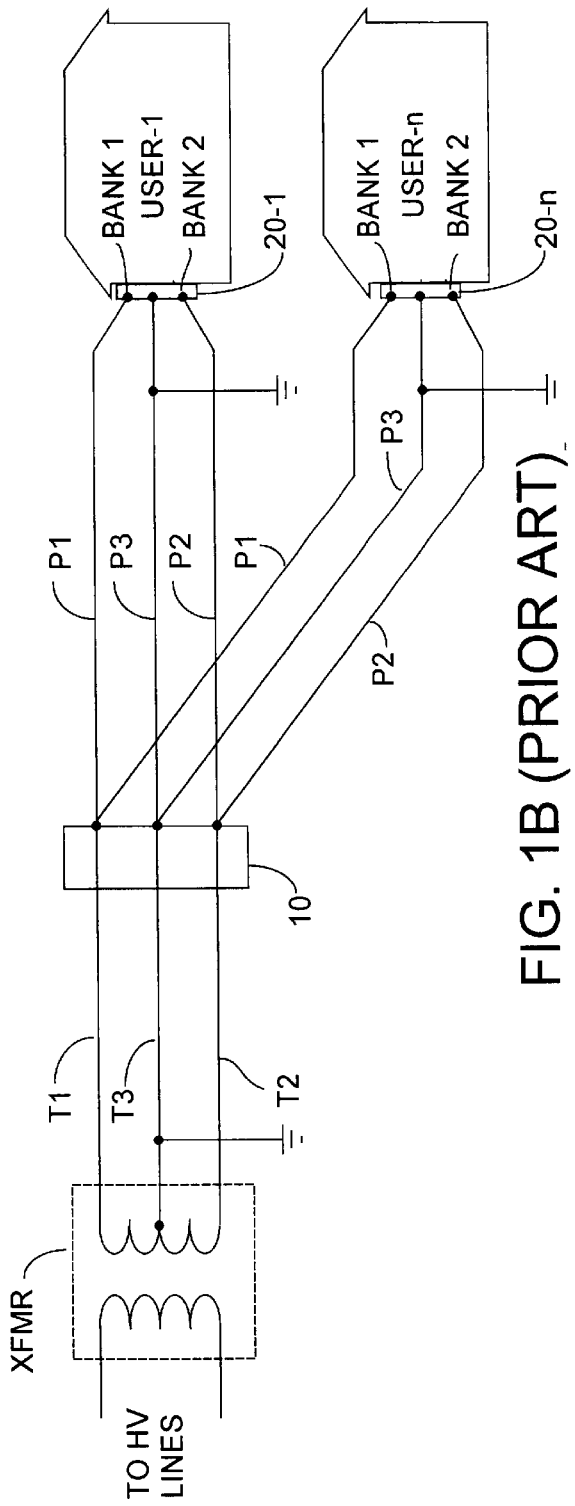
FIG. 1B (PRIOR ART)
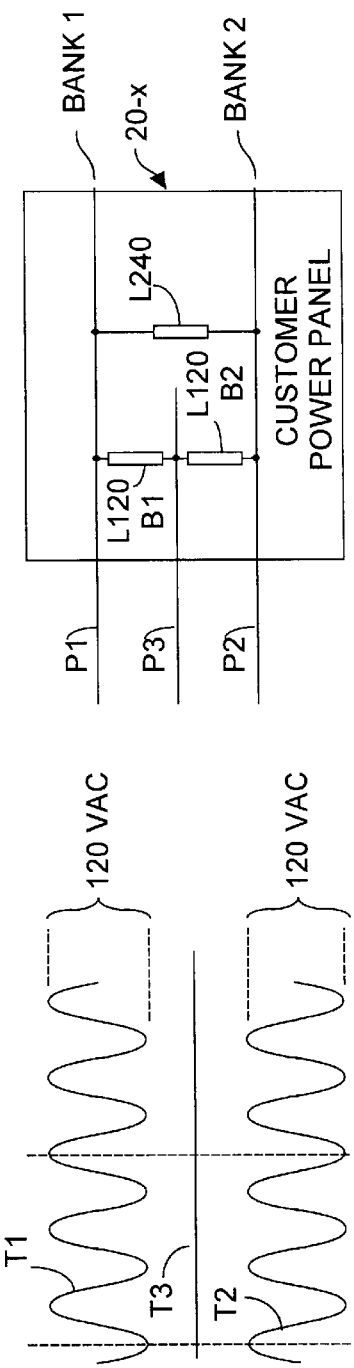
FIG. 1D (PRIOR ART)
FIG. 1C (PRIOR ART)

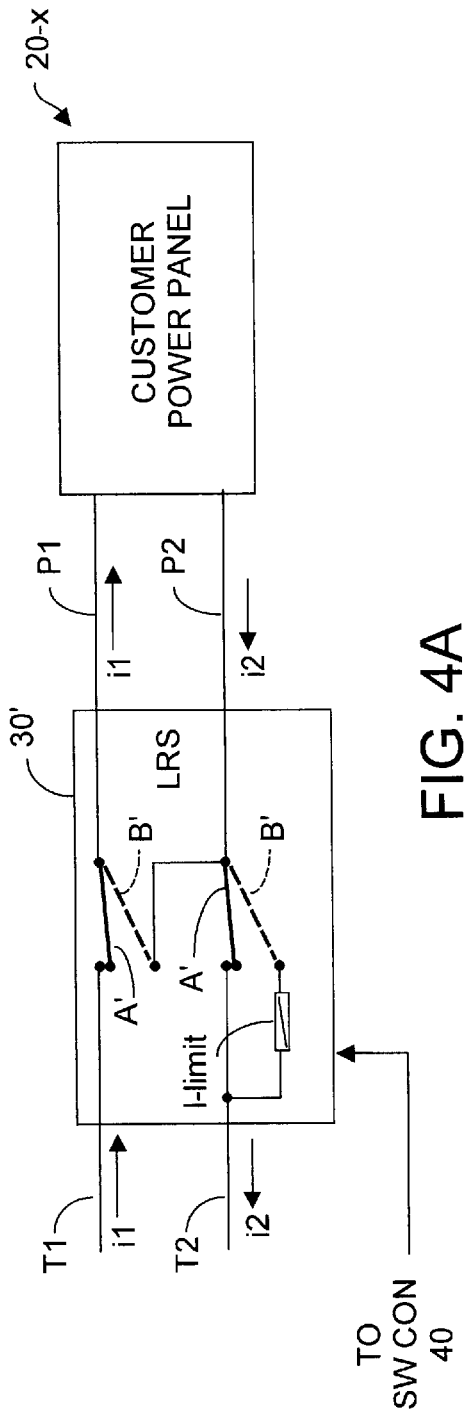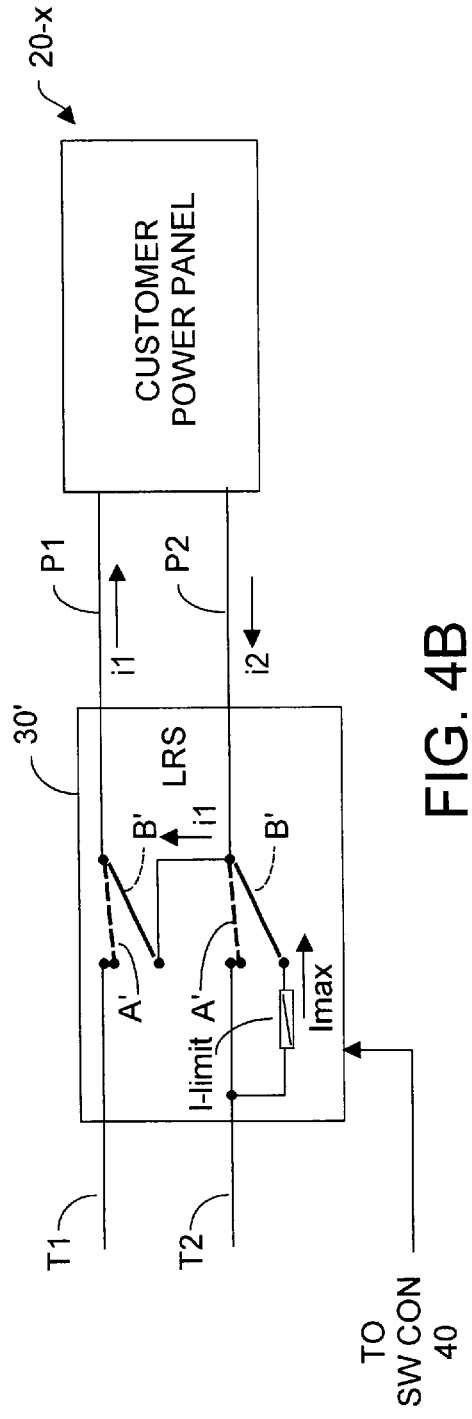
FIG. 4A
FIG. 4B

METHOD AND SYSTEM TO AUTOMATICALLY REDUCE GENERATED POWER

RELATION TO PENDING APPLICATION

Prior is claimed from U.S. provisional patent application serial No. 60/275,922 filed Mar. 14, 2001, entitled "Automatic Load Reduction System for Electric Utilities".

FIELD OF THE INVENTION

The invention relates generally to methods and systems by which power utility companies can reduce power demand by utility customers, and more particular to automatic methods and systems by which a utility can selectively terminate output of high voltage (220 VAC) power while continuing to provide low voltage (120 VAC) power to utility customers.

BACKGROUND OF THE INVENTION

Millions of electrical power users in the western United States and especially in California have experienced the crisis that can arise when the demand for electrical power exceeds the ability of power utility companies to generate and distribute such power. Millions of customers experienced "rolling blackouts" during which no electrical power was made available to residential and even large businesses in certain regions that were identified in advance. In other instances, electrical power was made available but at exorbitantly high cost per kilowatt/hour. States and other public entities paid billions of dollars to obtain emergency electrical power, and even then many customers went without power at all times. Further, many users went to great extremes and inconvenience to voluntarily reduce power consumption during the time of such crisis. In addition to the inconvenience of substantially curtailed electrical consumption, and the high price of such power as was consumed, many commercial businesses sustained substantial economic losses due to the energy crisis.

FIG. 1A typifies the power distribution system common used throughout North America for most homes and small businesses. The power company (UTILITY) generates high voltage (HV), typically many tens of thousands of volts of alternating current (AC) voltage, that it distributes across power lines suspended from utility poles. Standard distribution transformers XFMR are used to step-down the high voltage to provide two lower voltage "hot" lines denoted T1 and T2, and a ground or neutral line T3. Lines T1, T2, T3 typically interface from transformer XFMR via a metal conductor power block 10 and are brought into a user's facility (e.g., USER-1, . . . , USER-n) via customer or user input lines P1, P2, P3 respectively via a power panel (20-1, . . . 20-n), associated with each user's facility.

Each power panel is defined as having two banks, Bank 1, Bank 2, as best seen in the schematic representation of FIG. 1B. As shown in FIG. 1B, the T3 output line of the distribution transformer is coupled to ground, usually near the transformer, and the user line P3 is coupled to ground, usually near the power panel. While FIGS. 1A and 1B depict only two user's receiving power from a single distribution transformer, in practice more than two users are serviced by a single distribution transformer. The relationship between the various voltage phases is shown in FIG. 1C. T1 and T2 each carry one phase of 120 VAC 60 Hz relative to T3 and are 180° out of phase relative to one another. Thus, an electrical connection between T1 and T3 or between T2 and T3 will provide 120 VAC, whereas an electrical connection between T1 and T2 will provide 240 VAC.

Most household appliances operate from 120 VAC, and will receive potential from Bank 1 or Bank 2, e.g., from T1 relative to T3 or from T2 relative to T3. However some appliances require higher operating power such as air conditioners, electric water heaters, electric ranges, electric clothes dryers, etc. and are intended to receive 240 VAC. Such appliances are provided with 240 VAC from Bank 1 to Bank 2, e.g., from T1 to T2. (Understandably, an appliance that consumes say 2 KW of electrical power requires half the current when operated at 240 VAC than when operated at 120 VAC.)

FIG. 1D depicts a customer power panel 20-x and shows the equivalent circuit of the various customer loads that may be present across lines P1-P3, and/or P2-P3, and/or P1-P2. It is understood that the equivalent circuit of the various loads may be inductive, resistive, capacitive, or some combination thereof. In FIG. 1D, load L 120 B-1 represents the appliances or other loads coupled to receive Bank 1 120 VAC at the customer's location. Load L 120 B-2 represents loads coupled to receive Bank 2 120 VAC at the customer's location, while load L 240 represents loads coupled to receive 240 VAC at the customer's location, perhaps an electric oven and an electric water heater. All three loads are shown with cross-hatching to depict that they can receive operating potential via power panel 20-x.

In an attempt to reduce power consumption during high demand periods or crises, utility companies have attempted to implement systems to reduce power consumed by certain users, without terminating all of the user's power. Such prior art attempts have included installing special remote-controllable switches on air conditioners. Upon receipt of a control signal, e.g., via radio or special telephone, a relay can de-couple such appliances from the AC power lines, thus reducing peak power, while still permitting other appliances within the user's facility to operate. But such attempts require installation of literally millions of such remote-controllable switches, and require customer approval.

What is needed is a more efficient system to allow a power utility to reduce user peak power demand. Preferably when user locations do not have so-called branch wiring, such system should be implemented and operable without having to install remote-controllable switches at each user location. Preferably such system should be operable, without prior customer approval, to reduce or eliminate consumption of 240 VAC, while still permitting normal consumption of 120 VAC.

The present invention provides such a system.

SUMMARY OF THE INVENTION

The present invention provides a load reduction switch (LRS) and a switch controller that can reconfigure the LRS in response to a utility-issued input signal. The LRS and switch controller are coupled, electrically, downstream from a distribution transformer and upstream from a user facility, either before or after, or indeed within, the user's power meter. The distribution transformer outputs out-of-phase 120 VAC on T1 and T2 lines (for respective Bank 1 and Bank 2 voltage supply), and further includes a neutral T3 line. Relevant consumer locations normally are coupled via user lines P1, P2, P3 to the T1, T2, T3 lines. In use, one active line, e.g., T2 is always connected to P2, but the T1-to-P1 connection is controlled by the configuration of the LRS. In normal mode, the LRS maintains the T1-P1 connection, and the user can obtain 120 VAC and 240 VAC.

In one embodiment, during a first mode of operation, the LRS disconnects P1 from T1 and simply allows P1 to float.

In this mode, 120 VAC is available at Bank 2, but normally there will be neither 120 VAC at Bank 1, nor 240 VAC provided to the user. If a user 120 VAC appliance is turned-on and coupled to Bank 1, and if a user 240 VAC appliance is also turned-on and coupled across Bank 1 and Bank 2, such turned-on appliances will attempt to share a total of 120 VAC, but no 240 VAC will be present. In that embodiment, during a second mode of operation, the LRS couples P1 to T2 (and thus to P2), and in-phase 120 VAC is available at Bank 1 and Bank 2, but again no 240 VAC is provided to the user. Some consumer locations have so-called branch circuit wiring in which a common neutral line returns current delivered to loads via the P1 line or the P2 line. In such installations, current-limiting devices are placed in series with the P1 and P2 lines. These devices prevent an excessively high magnitude of in-phase resulting from the summation of the and P2 line currents from passing through the common neutral return line.

In a more favored embodiment, the LRS functions as a double pole double throw switch. In normal operation, the LRS connects T1 to P1, and T2 to P2, thus providing Bank 1 and Bank 2 of 120 VAC, and 240 VAC. But in a power conservation mode, the LRS is reconfigured such that T1 floats, and P1 is connected to P2, and collectively P1 and P2 are coupled via a current limiting device to T2. This mode of operation provides in-phase 120 VAC to Bank 1 and Bank 2, but no 240 VAC.

By commanding the LRS to reconfigure via the switch controller, a power utility company can cut-off delivery of 240 VAC to users, and can, if desired, eliminate one Bank of 120 VAC to users. The LRS and/or controller unit may be disposed on a utility power pole, adjacent the distribution transformer, or at a user facility, for example within the user's power meter. The LRS may be implemented as a mechanical switch and/or as a switch comprising solid state devices.

Other features and advantages of the invention will appear from the following description in which the preferred embodiments have been set forth in detail, in conjunction with the accompanying drawings.

BRIEF DESCRIPTION OF THE DRAWINGS

FIG. 1B is a schematic depiction of the system of FIG. 1A, according to the prior art;

FIG. 1C depicts phase relationships between T1-T2-T3 according to the prior art;

FIG. 1D depicts loaded coupleable to a customer power panel, according to the prior art;

FIGS. 4A and 4B depict an LRS and various modes of operation for a second embodiment of the present invention.

DETAILED DESCRIPTION OF THE PREFERRED EMBODIMENT

Figure 1A:
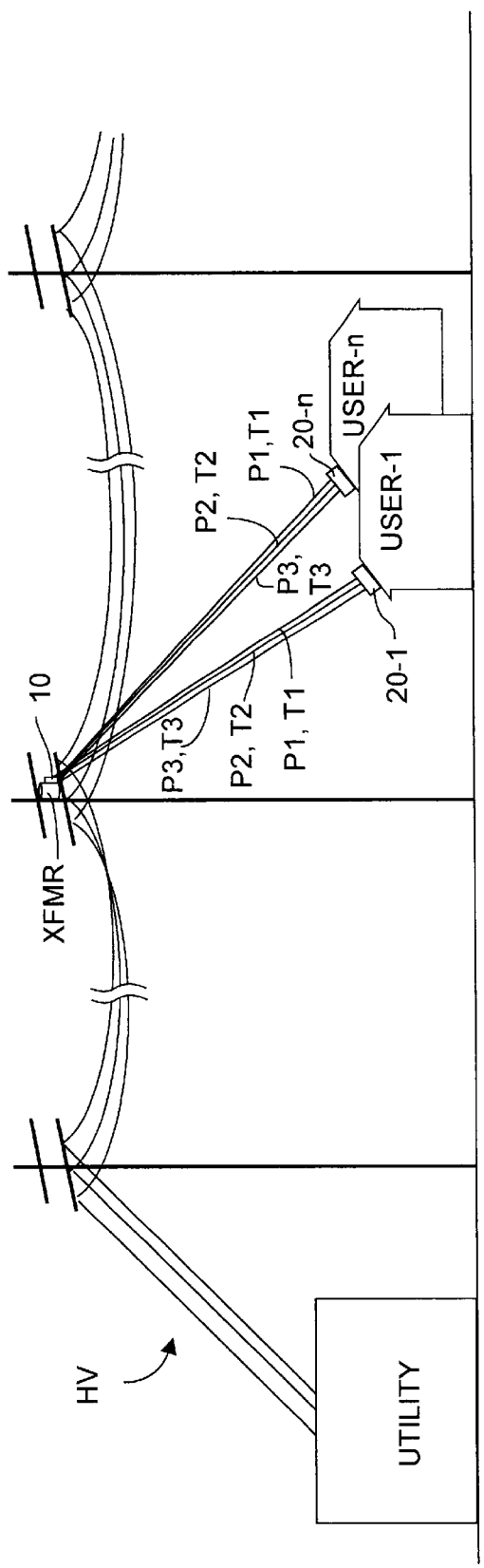
FIG. 1A depicts a generic system for distribution 120 VAC and 220 VAC, according to the prior art.
Figures 2A, 2B:
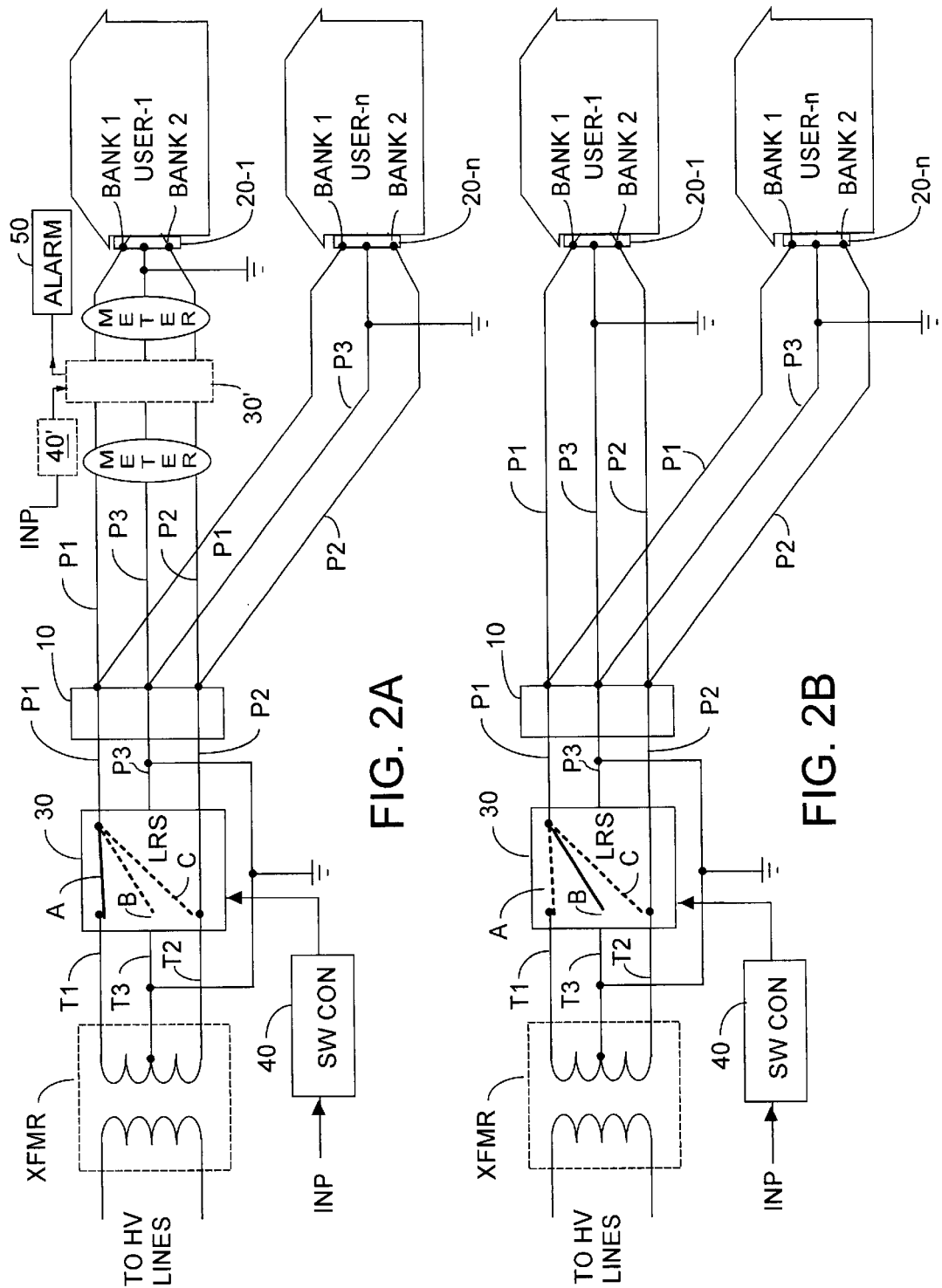
FIGS. 2A–2C depict a load reduction switch (LRS) and switch controller and various modes of operation of a first embodiment of the present invention.
Figure 2C:
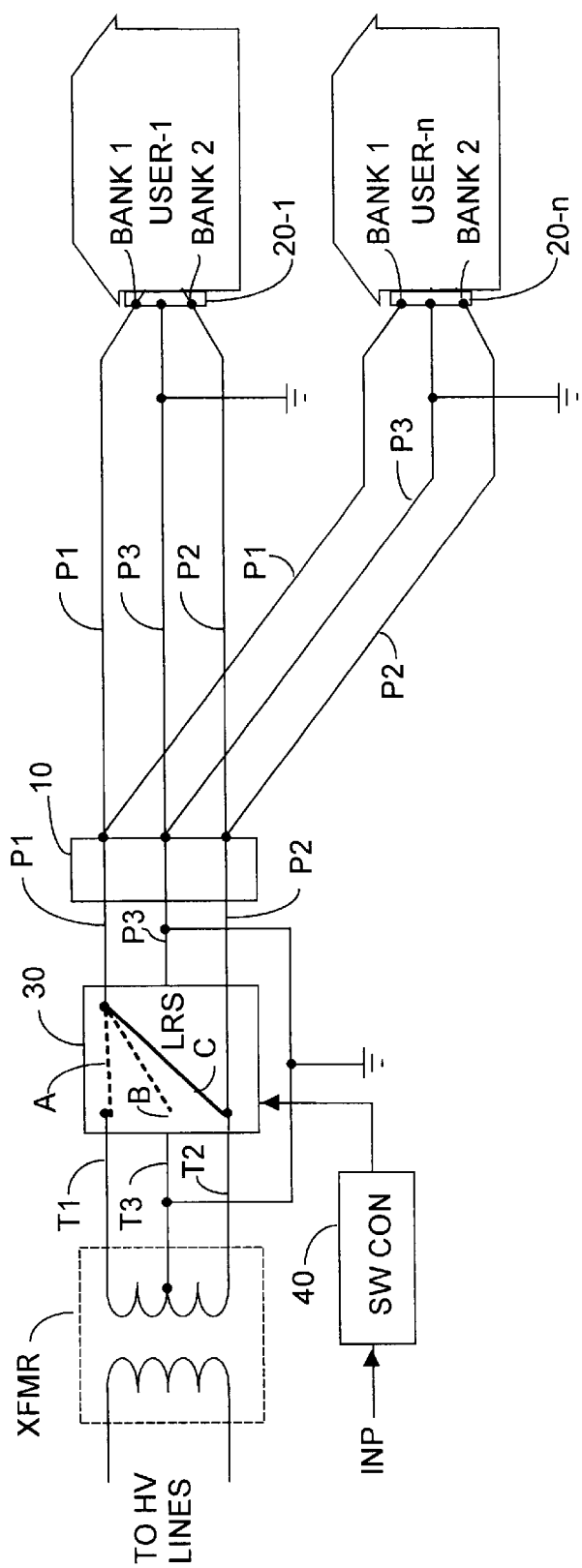

FIGS. 2A–2C depict various modes of operation of a first embodiment of the present invention. In some aspects, FIGS. 2A–2C are similar to prior art FIG. 1B. However the present invention provides a load reduction system (LRS) that includes a load reduction switch (LRS) 30 and a switch control unit 40. In one embodiment, LRS 30 modifies the utility transformer power supplied to a customer by disconnecting the T1 or the T2 hot line from the single phase distribution transformer (XFMR). LRS 30 may be manually controlled and can include without limitation a circuit breaker or similar switch, an electronic switch, or the like, or other mechanism able to make or break electrical connection between a customer P1 and/or P2 line and a distribution transformer T1 and/or T2 line. In the embodiments of FIGS. 2A–2C, LRS 30 can function as a single pole, triple throw switch that can be in configuration A, in configuration B, or in configuration C.

However implemented, LRS 30 preferably is remotely controllable via a switch controller unit 40. Switch controller unit 40 can respond to a variety of input signals including, without limitation, a wireless signal, a radio signal, a signal communicated via satellite, a signal communicated via a paging service, a signal transmitted via electrical power transmission line(s), and a clock timer signal. As described below, in response to an input signal communicated from a power utility company, switch control unit 40 can cause load reduction switch 30 to connect T1 to P1 in configuration A (normal operation), to disconnect T1 from P1 in configuration B, or to couple T2 to P1 in configuration C.

FIG. 2A depicts configuration A, a normal mode of operation in which each user's bank 1 or bank 2 receives 120 VAC, and in which 240 VAC is available to each user between bank 1 and bank 2. Assume now that there is a power crisis and the utility company that provides HV input to each distribution transformer XFMR must curtail power consumption. As shown in FIG. 2B, the utility company can promulgate an appropriate input (INP) signal to each switch controller 40 to cause LRS 30 to enter configuration B. In this so-called first mode of operation (Mode 1), T1 is disconnected from P1, but T2 continues to be coupled to P2. As a result, no user downstream from power block 10 will receive 240 VAC, since there is no AC potential at Bank 1. However since Bank 2 is still connected to P2 and to T2, 120 VAC remains available to Bank 2. As a result, household or other appliances coupled to Bank 2 will continue to receive normal 120 VAC power. It will be appreciated that since the power system is essentially symmetrical, this Mode 1 operation could instead enable the T1-P1 connection and interrupt the T2-P2 connection, in which case 120 VAC would be available at Bank 1, and no 240 VAC would be available.

In FIG. 2C, the utility has promulgated an input (INP) signal to each relevant switch controller 40 commanding load reduction switch 30 to enter configuration C. In this second mode of operation (Mode 2), 120 VAC is available to each downstream user from Bank 1 and from Bank 2. The 120 VAC available from Bank 1 is in-phase with the 120 VAC available from Bank 2, since each bank sees the same input 120 VAC. Since the 120 VAC is in-phase at each bank, there is no differential voltage to generate a 240 VAC potential. As a result, no power is delivered to any 240 circuit or appliance served by each user's power panel 20-x, although 120 VAC appliances coupled to Bank 1 or to Bank 2 will continue to receive 120 VAC operating potential.

Referring to FIGS. 2A–2C, it will be appreciated that load reduction 30 and switch controller 40 may be installed on the utility company's utility pole, or on distribution transformer (XFMR). Of course some or all of units 30 and/or 40 could be installed at customer or user locations, e.g., switch controller 40' and LRS unit 30' in FIG. 2A. Although more costly to implement than utility pole or transformer location, one advantage of user-facility location for LRS 30 and/or controller 40 is that an alarm mechanism 50 could be coupled to one or both of these units to provide and acoustic and/or visible alarm when loss of 240 VAC occurs. For example, a user in the midst of drying clothes in an electric dryer could know to remove the clothes for drying outside. It is understood that at the user location, LRS 30' may be disposed electrically before or after the user's power meter (METER). Indeed, LRS 30' may be disposed within the power meter to accomplish switching before or after power measuring within the meter. Thus FIG. 2A depicts, for sake of illustration, a power meter before and after LRS 30', although in practice but a single power meter would be present.

Thus, ideally Mode 1 operation reduces substantial power consumption by eliminating supply of 240 VAC, without interrupting customer supply of 120 VAC. Mode 2 operation can be used where there are no problems associated with overloading neutral lines (T3), and/or damaging 120 VAC appliances when the 120 VAC power available from Bank 1 and Bank 2 have common phase. In either mode of operation, power consumption is reduced because the 240 VAC appliances no longer receive operating power. This loss of 240 VAC will remain until the proper input (INP) command is issued to switch controller 40 to cause LRS 30 to once more enter configuration A. The various 240 VAC appliances within each user facility are essentially turned-off, as though they had been manually turned off, or commanded to turn-off locally, for example by a thermostat or a timer. Power demand is automatically reduced, yet customers still have at least some 120 VAC power. The invention may eliminate the need for rolling blackouts during which some customers lose all power, e.g., 240 VAC and 120 VAC power.

Figure 3A:
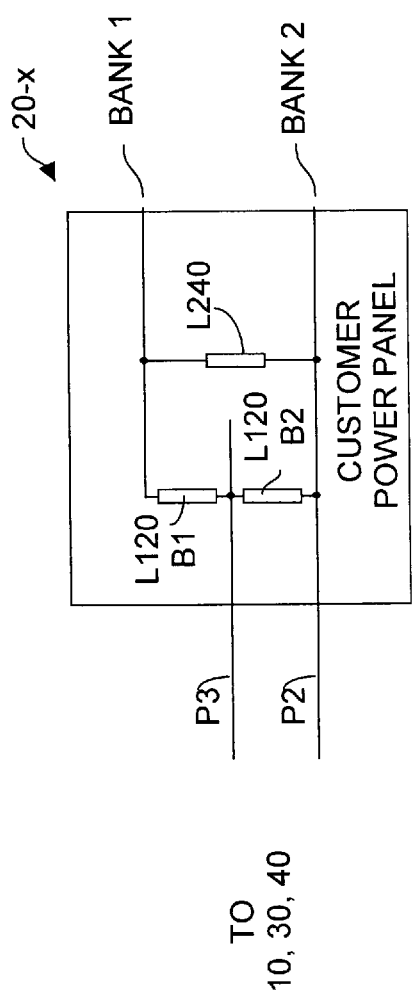
FIG. 3A depicts possible loads and practical design considerations for Mode 1 operation of an LRS, according to the present invention.

In practice, the explanation of the embodiments of FIGS. 2B and 2C are somewhat over simplified. Consider further customer power panel 20-x during Mode 1 operation of LRS 30. From FIG. 2C it is seen that in Mode 1 operation, LRS 30 causes the customer's P1 line to simply float, without making electrical connection to T1 or any other line. FIG. 3A depicts the resultant equivalent circuit within power panel 20-x. Load 120-B2 is shown cross-hatched to indicate that can receive 120 VAC power from Bank 2. In reality, load L120 B1 is electrically coupled in series with load L240, and the resultant series-coupled load is connected between neutral line P3 and 120 VAC line P2. These loads are shown partially cross-hatched because if any 240 VAC appliance is turned-on, and if any 120 VAC appliance connected to Bank 1 is also turned on, the effective loads represented by these appliances will complete an electrical connection and thus define a circuit path between P3 (neutral) and P2 (120 VAC). In essence, these turned-on appliances will attempt to share the 120 VAC that is present between P3 and P2, the sharing being proportional to the relative impedances of L120 B1 and L240. The result will be that such turned-on appliances will actually see some operating voltage, although less than 120 VAC. (The voltage seen will be less than 120 VAC since the sum of the voltage seen by L120 B1 and the voltage seen by L240 will add up to the voltage seen by L120 B 2, e.g., the sum is 120 VAC.)

Household light bulbs that may comprise part or all of L120 B1 will glow dimly, and turned-on appliances comprising L240 may malfunction or suffer damage. Indeed, some 120 VAC appliances comprising part or all of L120 B1 may behave unpredictably, poorly voltage-regulated home computers, for example. However, if during Mode 1 operation no 240 VAC appliances happen to be turned-on, then there is no complete circuit path from P3 through L120 B1 through L240 to P2, and neither L120 B1 nor L240 will receive operating potential. By the same token, should every single 120 VAC appliance coupled to Bank 1 happen to be turned-off, neither L120 B1 nor L240 would receive operating potential.

From the above description of FIG. 3A, it will be appreciated that Mode 1 operation or LRS 30 is less preferably than Mode 2 operation. As will now be described with reference to FIG. 3B, the idealized description of Mode 2 operation given with respect to FIG. 2C may give rise to problems in some installations where the customer location is wired for so-called branch circuit operation.

Figure 3B:
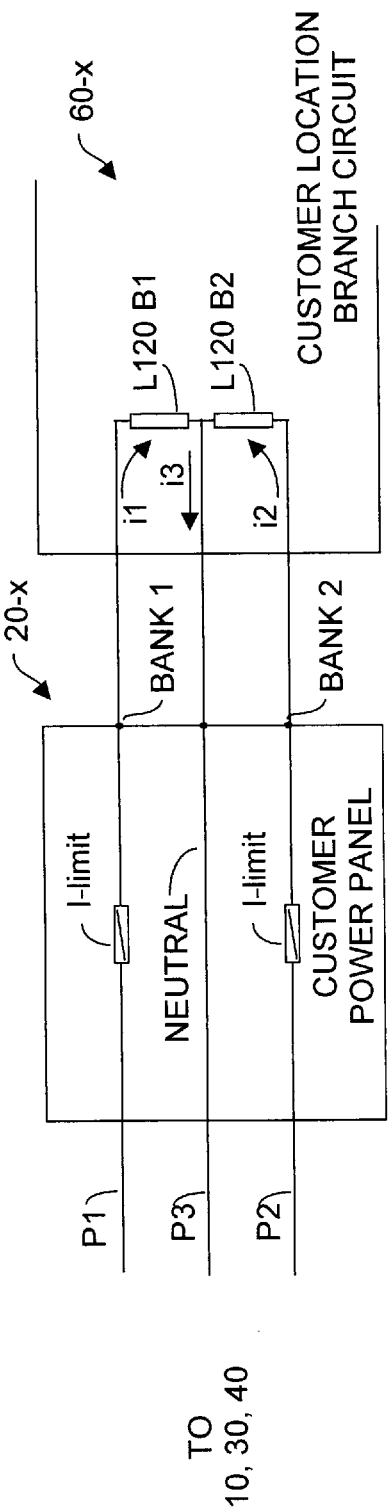
FIG. 3B depicts possible current paths and practical design considerations for Mod2 2 operation of an LRS, according to the present invention.

FIG. 3B depicts so-called branch circuit wiring 60 found in many user locations in which a common neutral line (NEUTRAL) is present and can carry current i3 that is the sum of current i1 (flowing through 120 VAC load L120 B1) and current i2 (flowing through 120 VAC load L120 B2). Again, the B1 and B2 notation on loads L120 denotes Bank 1 120 VAC and Bank 2 120 VAC loads, respectively. Under normal operation, the 120 VAC present on line P1 is 180° out of phase relative to the 120 VAC carried on line P2, and the return neutral current i3 can never exceed the larger of current i1 (drawn by L120 B1) or i2 (drawn by L120 B2). Indeed, when loads L120 B1 and L120 B2 are equal (or balanced), i1≈−i2, and i3 ideally is zero.

But from FIG. 2C it will be recalled that Mode 2 operation of LRS 30 puts the same in-phase 120 VAC across Bank 1 and Bank 2 loads. The undesired result is that i1 and i2 can now be in-phase and will add rather than substrate current magnitudes, and the resultant magnitude of i3 may exceed the safe current-carrying rating of the neutral wiring (NEUTRAL). Understandably this can give rise to unsafe operation that could result in overheating the neutral wiring with the possibility of a fire at the customer location. For this reason it is desired to include a current limiting device, perhaps a circuit breaker, to ensure that the maximum current magnitude allowed in any branch circuit's neutral line will not be exceeded. Thus, FIG. 3B shows current limiting devices I-limit in series with the P1 line and with the P2 line to limit i1 and i2, and thus to safely limit the magnitude of any current i3.

FIGS. 4A and 4B depict a second embodiment of a load reduction switch (LRS) 30', according to the present invention, that addresses the possible problems described with reference to FIGS. 3A and 3B. In FIGS. 4A and 4B, LRS 30', regardless of how it is implemented, e.g., mechanically, electronically, etc., is preferably a double pole double throw switch. In a first mode shown in FIG. 4A, switch controller 40 has commanded LRS 30' to be in the A' configuration. In this normal mode configuration, there is continuity from T1 to P1 and from T2, via a current limiting device (I-limit) to P2. In this mode, the customer power panel 20-x can receive normal power from input lines P1 and P2, which as noted carry out-of-phase 120 VAC that is available as Bank 1 and Bank 2. Further, 240 VAC is available between P1 and P2.

In FIG. 4B, LRS 30' is in a second mode configuration, and the switch contacts are now moved to configuration B'. In this configuration, electrical contact between T1 and P1 is broken, but P1 and P2 are both coupled to T2, preferably via current limiting device I-limit. Thus, P1 and P2 both receive in-phase 120 VAC, but the over-current problem described with respect to FIG. 3B is addressed by including I-limit.

I-limit is sized to ensure that the maximum magnitude current flowing into P1 and P2 (e.g., i1, i2) is less than the rated current carrying capacity of any branch circuit neutral line in the user or customer location that may be served by power panel 20-x. In practice, branch circuits in modern homes are wired with #12 gage copper wire, and current limiting devices I-limit will typically be rated at perhaps 20 A Imax. Thus, the branch neutral wire (NEUTRAL) in FIG. 3B should be rated to carry at least 20 A. For ease of illustration, the branch neutral wire is not shown in FIGS. 4A and 4B. It will be appreciated that the embodiment of FIG. 4B may be considered as a special case of the embodiment of FIG. 2C.

It will be appreciated that during a power crisis when the power utility must reduce power consumption, an LRS according to the present invention is switched out of normal mode and is reconfigured as shown in FIG. 4B to eliminate supply of 240 VAC to the user. In the various embodiments of the invention, a customer location rated at 20 A can still receive 120 VAC or 2.4 KW, according to the present invention during a power crisis. The alternative in a power black-out would be 0 KW. In the various embodiments it is understood that LRS 30 and/or LRS 30' may be implemented as mechanical switches, or as switches that comprise solid state devices. However implemented, it is preferred that LRS 30, LRS 30' can be reconfigured in response to a remotely issued signal, e.g., a command to enter power consumption mode that is promulgated by the power utility company via switch controller(s) 40.

In practice, use of the present invention should create an overall power demand reduction of 15% or more across a utility's customer base, and substantially more during summer peak demand times when many 240 VAC air conditioners are turned on. Such power savings may be sufficiently substantial to avoid most peak power crises, to avoid the high expense of providing for emergency power, and/or to reduce demand for additional power generating plants to handle peak power demands. LRS 30 and/or switch controller 40 may be disposed on a utility power pole or distribution transformer, depending upon whether branch circuits are being served by the transformer. In such position, the switch controller and/or LRS are beyond customer control and under exclusive control of the power utility, which can issue an input command when necessary to various switch controllers 40 to reconfigures LRS units 30, 30' to conserve power. If user branch circuits are present, it may be advantageous to dispose the LRS locally at the customer location rather than limit each customer to the Imax rating of the current protection device. For example, several customers may be residential homes, whereas some customers may be small factories that require more than about 2.4 KW even during an energy crisis.

Tests conducted by the California Energy Commission on typical homes during the summer of 2001 confirm that 2.4 KW of 120 VAC is sufficient to power nearly all essential home appliances such as lights, refrigerators, microwave ovens, entertainment devices, computers, etc. Such tests confirmed that implementation of an LRS according to the present invention can reduce household power consumption, especially from 240 VAC air conditioners, by up to 70% during peak summer power usage periods. In implementing an LRS according to the present invention, it may be useful to execute a fixed time delay of perhaps 0.01 seconds to several seconds when changing modes, to minimize the chance of damage to appliances with electric motors. For example, 120 VAC can be terminated to appliances in a Bank for a brief period before opposite phase 120 VAC is provided. Circuits for implementing such time delays are known in the art and need not be described herein.

Modifications and variations may be made to the disclosed embodiments without departing from the subject and spirit of the invention as defined by the following claims.

What is claimed is:

1. A method to reduce consumer power consumption in a system that includes a first line T1 carrying 120 VAC that is normally coupled to a consumer's P1 line, a second line T2 carrying 120 VAC that is substantially 180° out-of-phase with said first line and that is normally coupled to a consumer's P2 line, and a neutral line T3 that is normally coupled to a consumer's P3 line, the method comprising the following steps:

(a) during power conservation mode, interrupting an electrical connection selected from a group consisting of (i) connection between T1 and P1, and (ii) connection between T2 and P2.

2. The method of claim 1, wherein:

step (a) includes allowing one of P1 and P2 to float electrically.

3. The method of claim 1, wherein:

step (a) interrupts electrical connection between T1 and P1; and further including:

(b) electrically coupling P1 to P2.

4. The method of claim 3, further including:

(c) series-coupling a current limiter between T2 and a junction of P1 and P2.

5. The method of claim 1, wherein:

step (a) interrupts electrical connection between T2 and P2; and further including:

(b) electrically coupling P1 to P2.

6. The method of claim 5, further including:

(c) series-coupling a current limiter between T1 and a junction of P1 and P2.

7. The method of claim 1, wherein:

step (a) includes providing a double pole double throw switch that in a normal mode couples T1 to P1 and T2 to P2, but during said power conservation mode couples P1 to P2, allowing T1 to float electrically, and couples a junction of P1 and P2 to T2.

8. The method of claim 7, further including:

(b) series-coupling a current limiter between T2 and said junction of P1 and P2.

9. The method of claim 7, wherein step (a) includes providing a switch selected from a group consisting of (i) a mechanical switch, (ii) a remotely-controllable mechanical switch, (iii) a solid state switch, and (iv) a remotely controllable solid state switch.

10. The method of claim 1, wherein:

step (a) includes providing a double pole double throw switch that in a normal mode couples T1 to P1 and T2 to P2, but during said power conservation mode couples P1 to P2, allowing T2 to float electrically, and couples a junction of P1 and P2 to T1.

11. The method of claim 10, further including:

(b) series-coupling a current limiter between T1 and said junction of P1 and P2.

12. The method of claim 10, wherein step (a) includes providing a switch selected from a group consisting of (i) a mechanical switch, (ii) a remotely-controllable mechanical switch, (iii) a solid state switch, and (iv) a remotely controllable solid state switch.

13. A method to reduce consumer power consumption in a system that includes a first line T1 carrying 120 VAC that is normally coupled to a consumer's P1 line, a second line T2 carrying 120 VAC that is substantially 180° out-of-phase with said first line and that is normally coupled to a consumer's P2 line, and a neutral line T3 that is normally coupled to a consumer's P3 line, the method comprising the following steps:

(a) providing a switch that during power conservation mode interrupts electrical connection between T1 and P1, connects P1 and P2, and couples a junction of P1 and P2 to t2.

14. The method of claim 13, further including:

(b) series-coupling a current limiter between T2 and said junction of P1 and P2.

15. The method of claim 13, wherein said P1 is coupled to said consumer's Bank 1 to provide 120 VAC.

16. The method of claim 13, wherein step (a) includes selecting said switch from a group consisting of (i) a mechanical switch, (ii) a remotely-controllable mechanical switch, (iii) a solid state switch, and (iv) a remotely controllable solid state switch.

17. The method of claim 13, wherein said switch is disposed at a location selected from a group consisting of (i) on a utility pole carrying at least one of said T1, T2, T3 (ii) on a distribution transformer outputting 120 VAC carried by said T1 and T2, (iii) at a consumer location whereat power is to be conserved, (iv) at a consumer location whereat power is to be conserved before a power meter, (v) at a consumer location whereat power is to be conserved after a power meter, and (vi) at a consumer location whereat power is to be conserved within a power meter.

18. A system to reduce consumer power consumption generated by a power utility that distributes power via a first line T1 carrying 120 VAC that is normally coupled to the consumer's P1 line, via a second line T2 carrying 120 VAC that is substantially 180° out-of-phase with said first line and that is normally coupled to the consumer's P2 line, and via a neutral line T3 that is normally coupled to a consumer's P3 line, the system including:

a switch that during power conservation mode interrupts electrical connection between T1 and P1, connects P1 and P2, and couples a junction of P1 and P2 to T2.

19. The system of claim 18, further including:

a current limiting device series-coupled between said junction of P1 and P2 and T2.

20. The system of claim 18, further including:

a switch controller unit, functionally coupled to said switch, to reconfigure said switch from normal mode operation to power consumption mode operation upon receipt of a remotely issued command.

21. The system of claim 18, wherein said switch is selected from a group consisting of (i) a mechanical switch, (ii) a remotely-controllable mechanical switch, (iii) a solid state switch, and (iv) a remotely controllable solid state switch.

22. A system to reduce consumer power consumption generated by a power utility that distributes power via a first line T1 carrying 120 VAC that is normally coupled to the consumer's P1 line, via a second line T2 carrying 120 VAC that is substantially 180° out-of-phase with said first line and that is normally coupled to the consumer's P2 line, and via a neutral line T3 that is normally coupled to a consumer's P3 line, the system including:

means for interrupting, during power conservation mode, electrical connection between T1 and P1, for connecting P1 and P2, and for coupling junction of P1 and P2 to T2; and means for limiting current, coupled in series between said junction of P1 and P2, and T2.

23. The system of claim 22, further including:

means for reconfiguring said means for interrupting, for connecting, and for coupling between a normal mode and a power conservation mode, said means for reconfiguring responsive to a remotely issued command to reconfigure.

24. The system of claim 22, wherein said means for interrupting, for connecting, and for coupling includes a switch selected from a group consisting of (i) a mechanical switch, (ii) a remotely-controllable mechanical switch, (iii) a solid state switch, and (iv) a remotely controllable solid state switch.

* * * * *